(12) United States Patent
Qi

(10) Patent No.: US 11,332,069 B1
(45) Date of Patent: May 17, 2022

(54) METHODS, SYSTEMS, AND APPARATUSES IMPLEMENTING A VEHICLE-TO-EVERYTHING ENABLED SAFETY WARNING TRIANGLE REFLECTOR

(71) Applicant: GM GLOBAL TECHNOLOGY OPERATIONS LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/189,330

(22) Filed: Mar. 2, 2021

(51) Int. Cl.
| | | |
|---|---|---|
| *B60Q 7/00* | (2006.01) |
| *B60Q 1/52* | (2006.01) |
| *G09F 13/16* | (2006.01) |
| *H04W 4/90* | (2018.01) |
| *G08G 1/01* | (2006.01) |
| *H04W 4/44* | (2018.01) |
| *G07C 5/00* | (2006.01) |

(52) U.S. Cl.
CPC .............. *B60Q 7/00* (2013.01); *B60Q 1/52* (2013.01); *G07C 5/008* (2013.01); *G08G 1/0141* (2013.01); *G09F 13/16* (2013.01); *H04W 4/44* (2018.02); *H04W 4/90* (2018.02)

(58) Field of Classification Search
CPC . B60Q 7/00; B60Q 1/52; G07C 5/008; G08G 1/0141; G09F 13/16; H04W 4/44; H04W 4/90
See application file for complete search history.

(56) References Cited

FOREIGN PATENT DOCUMENTS

| CN | 205632279 | * | 10/2016 | |
|---|---|---|---|---|
| CN | 109615854 | * | 4/2019 | ............. G08G 1/012 |
| KR | 20200108528 | * | 9/2020 | ............... B60Q 7/00 |

* cited by examiner

*Primary Examiner* — Hongmin Fan
(74) *Attorney, Agent, or Firm* — Lorenz and Kopf LLP

(57) ABSTRACT

In various embodiments, methods, systems, and vehicle apparatuses are provided. The method includes receiving, via an interface of the V2X enabled safety triangle warning reflector, vehicle information before deployment for storing the vehicle information in a memory disposed locally at the V2X enabled safety triangle warning reflector for subsequent use at the deployment; generating, by a processor chip in communication with the memory, a failure message associated with the vehicle failure based at least on the vehicle information contained locally in memory; and broadcasting, the failure message generated by the processor chip via a transmitter disposed of in the V2X enable safety triangle warning reflector during a vehicle failure, wherein the failure message is broadcasted in a surrounding area of the failure vehicle on a set of multiple different channels including cloud, infrastructure and personal communication service (PCS) channels to entities that provide traffic and vehicle control.

20 Claims, 4 Drawing Sheets

METHODS, SYSTEMS, AND APPARATUSES IMPLEMENTING A VEHICLE-TO-EVERYTHING ENABLED SAFETY WARNING TRIANGLE REFLECTOR

INTRODUCTION

The present disclosure generally relates to vehicle connectivity and communication systems and more particularly relates to methods, systems, and apparatuses of a vehicle-to-everything (V2X) enabled safety warning triangle reflector.

Vehicle-To-Everything (V2X) communication system is an emerging technology that will enable more robust ways that vehicles, drivers, and the external environment interact by interconnecting vehicles with more cooperative and intelligent transport and communication systems. V2X or Cellular V2X ("C-V2X") which uses 3GPP standardized 4G LTE or 5G mobile cellular connectivity enables the sending and receiving of signals from a vehicle to other vehicles, pedestrians, or traffic lights using the 5.9 GHz Frequency that is designated for intelligent transportation system (ITS).

Current safety warning triangle reflectors have limited ability to warn close incoming vehicles because of deficiencies of weak reflection lights and low visibilities. There are associated high risks from failures to provide sufficient warnings to incoming vehicles and to prevent traffic congestion because of vehicle failures. It is desirable to implement a safety warning triangle reflector that enables better warning when deployed to surrounding nearby vehicular traffic.

Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment a method to deploy a vehicle-to-everything (V2X) enabled safety triangle warning reflector is provided. The method includes: receiving, via an interface of the V2X enabled safety triangle warning reflector, vehicle information before deployment of the V2X enabled safety triangle warning reflector, for storing the vehicle information in a memory disposed locally at the V2X enabled safety triangle warning reflector for subsequent use at the deployment; generating, by a processor chip configured in the V2X enabled safety triangle warning reflector in communication with the memory, a failure message associated with the vehicle failure based at least on the vehicle information contained locally in memory wherein the vehicle information is independently generated without requiring a wireless connection with a failure vehicle; and broadcasting, the failure message generated by the processor chip via a transmitter disposed of in the V2X enable safety triangle warning reflector during a vehicle failure, wherein the failure message is broadcasted in a surrounding area of the failure vehicle on a set of multiple different channels including cloud, infrastructure, and personal communication service (PCS) channels to entities that provide traffic and vehicle control.

In at least one exemplary embodiment, the method further includes enabling broadcast of the failure message, by the V2X enabled safety triangle warning reflector, at a location that is at a distance that exceeds an operating field of the wireless connection to the failure vehicle.

In at least one exemplary embodiment, the method further includes broadcasting, via the transmitter, the failure message by the V2X enabled safety triangle warning reflector for receipt by cloud channels coupled to connected navigation systems of operating vehicles in the surrounding area to enable navigation alerts and route changes by the connected navigation systems.

In at least one exemplary embodiment, further includes broadcasting, via the transmitter, the failure message by the V2X enabled safety triangle warning reflector for receipt by infrastructure channels to traffic systems including at least traffic signals that sync signal operations to prevent traffic congestion caused by the failure vehicle in vehicle lanes in the surrounding area.

In at least one exemplary embodiment, further includes broadcasting, via the transmitter, the failure message by the V2X enabled safety triangle warning reflector on PCS channels within the distance of the failure vehicle for manual driver alerts of vehicles in the surrounding area.

In at least one exemplary embodiment, the method further includes broadcasting, via the transmitter, the failure message by the V2X enabled safety triangle warning reflector on PCS channels at multiple warning levels to enable measured autonomous vehicles and manual driver operational responses based on a warning level received.

In at least one exemplary embodiment, the failure message includes a set of failure messages that at least includes time information, vehicle identification, and location information, and V2X safety triangle warning reflector location information.

In another exemplary embodiment, a system that includes a processor chip configured with a set of instructions to enable a Vehicle-To-Everything (V2X) safety triangle warning device is provided.

In at least one exemplary embodiment, the enabled Vehicle-To-Everything (V2X) safety triangle warning device is provided to: receive via a wireless interface from a failure vehicle, vehicle identification information; store in memory locally at the V2X enabled safety triangle warning reflector device; generate a failure message associated with the vehicle failure from at least the vehicle identification information stored locally in memory without a wireless connection with the failure vehicle; and broadcast the failure message by a transmitter disposed of in the V2X enabled safety triangle warning reflector device during a vehicle failure in a surrounding area of the failure vehicle on a set of multiple different channels including cloud, infrastructure, and personal communication service (PCS) channels for receipt by a set of entities including vehicle navigation systems, traffic signals, and driver decision systems.

In at least one exemplary embodiment, the enabled Vehicle-To-Everything (V2X) safety triangle warning device is provided to enable the broadcast of the failure message, by the V2X enabled safety triangle warning reflector, at a location that is at a distance that exceeds an operating field of the wireless connection to the failure vehicle.

In at least one exemplary embodiment, the enabled Vehicle-To-Everything (V2X) safety triangle warning device is provided to broadcast, via the transmitter, the failure message by the V2X enabled safety triangle warning reflector for receipt by cloud channels coupled to connected navigation systems of operating vehicles in the surrounding area to enable navigation alerts and route changes by the connected navigation systems.

In at least one exemplary embodiment, the enabled Vehicle-To-Everything (V2X) safety triangle warning device is provided to broadcast, via the transmitter, the failure message by the V2X enabled safety triangle warning reflector for receipt by infrastructure channels to traffic systems including at least traffic signals that sync signal operations to prevent traffic congestion caused by the failure vehicle in vehicle lanes in the surrounding area.

In at least one exemplary embodiment, the enabled Vehicle-To-Everything (V2X) safety triangle warning device is provided to broadcast, via the transmitter, the failure message by the V2X enabled safety triangle warning reflector on PCS channels at multiple warning levels to enable measured autonomous vehicles and manual driver operational responses based on a warning level received.

In at least one exemplary embodiment, the enabled Vehicle-To-Everything (V2X) safety triangle warning device is provided with the failure message to include a set of failure messages that at least include time information, vehicle identification and location information, and V2X safety triangle warning reflector location information.

In yet another exemplary embodiment, a Vehicle-to-Everything (V2X) safety triangle warning reflector apparatus is provided.

In at least one exemplary embodiment, the Vehicle-to-Everything (V2X) safety triangle warning reflector apparatus is provided with a V2X safety triangle warning reflector controller that includes a processor chip wherein the processor chip is instructed to: receive via a wireless interface from a failure vehicle, vehicle identification information to store in memory locally at the V2X enabled safety triangle warning reflector device; generate a failure message associated with the vehicle failure from at least the vehicle identification information stored locally in memory without a wireless connection with the failure vehicle; and broadcast the failure message by a transmitter disposed of in the V2X enable safety triangle warning reflector device during a vehicle failure in a surrounding area of the failure vehicle on a set of multiple different channels including cloud, infrastructure, and personal communication service (PCS) channels for receipt by a set of entities including vehicle navigation systems, traffic signals, and driver decision systems.

In at least one exemplary embodiment, the Vehicle-to-Everything (V2X) safety triangle warning reflector apparatus is provided with the processor chip configured to enable the broadcast of the failure message, at a location that is at a distance that exceeds an operating field of the wireless connection to the failure vehicle.

In at least one exemplary embodiment, the Vehicle-to-Everything (V2X) safety triangle warning reflector apparatus is provided with the processor chip configured to broadcast, via the transmitter, the failure message for receipt by infrastructure channels to traffic systems including at least traffic signals that sync signal operations to prevent traffic congestion caused by the failure vehicle in vehicle lanes in the surrounding area.

In at least one exemplary embodiment, the Vehicle-to-Everything (V2X) safety triangle warning reflector apparatus is provided with the processor chip configured to broadcast, via the transmitter, the failure message for receipt by cloud channels coupled to connected navigation systems of operating vehicles in the surrounding area to enable navigation alerts and route changes by the connected navigation systems.

In at least one exemplary embodiment, the Vehicle-to-Everything (V2X) safety triangle warning reflector apparatus is provided with the processor chip configured to broadcast, via the transmitter, the failure message by the V2X enabled safety triangle warning reflector for receipt by infrastructure channels to traffic systems including at least traffic signals that sync signal operations to prevent traffic congestion caused by the failure vehicle in vehicle lanes in the surrounding area.

In at least one exemplary embodiment, the Vehicle-to-Everything (V2X) safety triangle warning reflector apparatus is provided with the processor chip configured to broadcast, via the transmitter, the failure message on PCS channels at multiple warning levels to enable measured autonomous vehicles and manual driver operational responses based on a warning level received.

In at least one exemplary embodiment, the Vehicle-to-Everything (V2X) safety triangle warning reflector apparatus is provided with the failure message that includes a set of failure messages that at least include time information, vehicle identification, and location information, and V2X safety triangle warning reflector location information.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
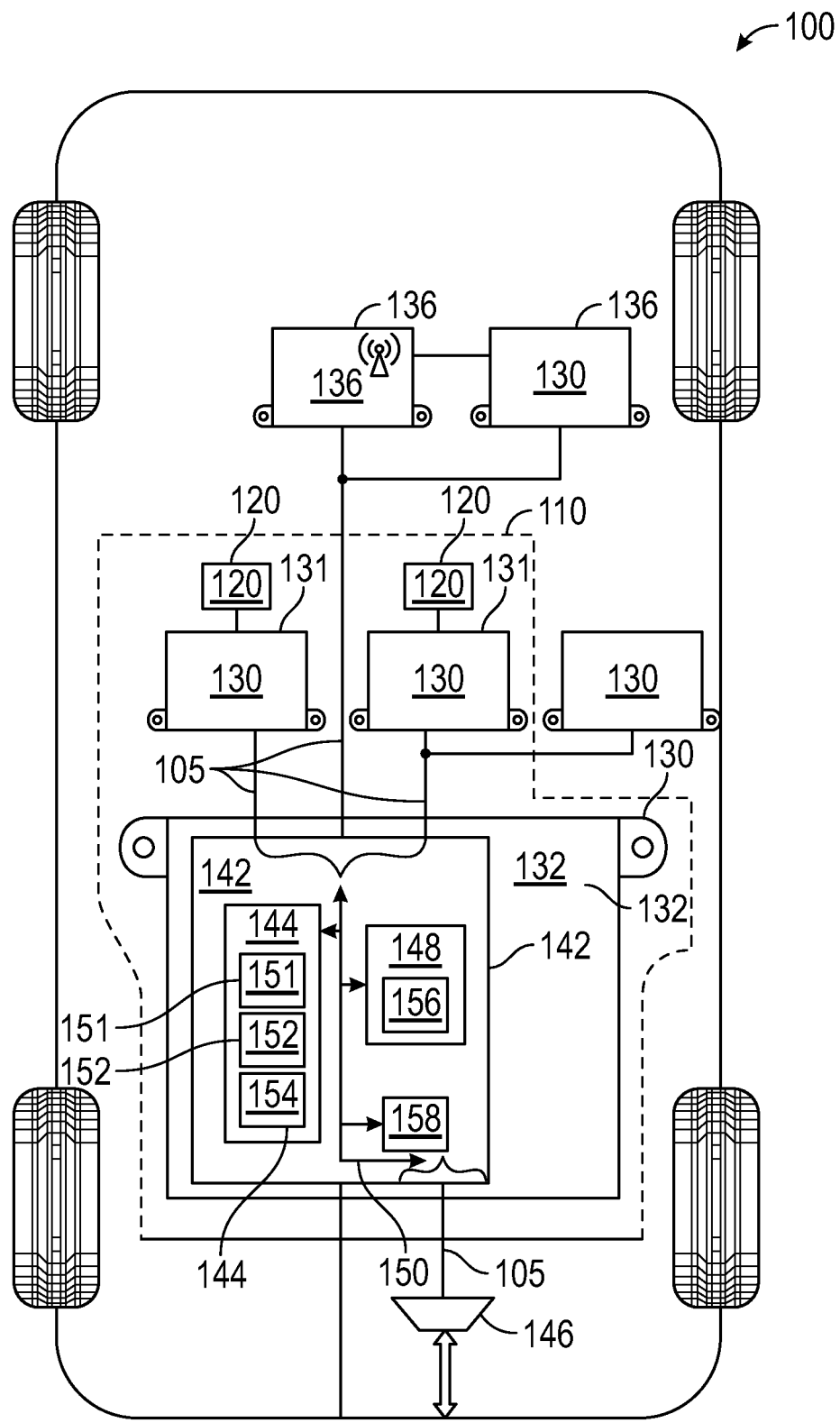
FIG. 1 illustrates a functional block diagram of an autonomous or semi-autonomous vehicle that is coupled with a Vehicle-To-Everything (V2X) enabled safety warning triangle in accordance with an exemplary embodiment.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. Also, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signalling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. determining, by the processor, that the passenger is departing the vehicle by data of the destination location of the vehicle based on navigation data received by the passenger mobile device.

In various exemplary embodiments, the present disclosure describes methods, systems, and apparatuses of a Vehicle-Everything (V2X) enabled safety warning triangle reflector to wirelessly broadcast a vehicle failure message directly to the surrounding vehicles with V2X capabilities.

In various exemplary embodiments, the present disclosure describes methods, systems, and apparatuses of a V2X enabled safety warning triangle reflector that can send wireless information to close approaching surrounding vehicle directly and can also notify the potential traffic participants to optimize maneuvers to reach enhanced traffic flow goals smoothly and efficiently via cloud-based services.

In various exemplary embodiments, the present disclosure describes methods, systems, and apparatuses for sending failure messages by the warning triangle reflector that include a V2X Failure service ID, a vehicle or a triangle location, lane information, timestamp data, and a vehicle ID (if applicable).

In various exemplary embodiments, the present disclosure describes methods, systems, and apparatuses that provide the capability to cloud and edge connected devices to receive the V2X failure messages for autonomous or semi-autonomous deployed vehicle navigation systems to receive updated traffic information and to optimize destination routes by executing detours and alternative routes based on the vehicle failure information. Also, the various navigation systems can be configured to distributed optimized route information resulting in the vehicle failure data to other vehicle's navigation systems in the connected ecosystem.

In various exemplary embodiments, the present disclosure describes methods, systems, and apparatuses that enable infrastructure with a direct V2X channel capability to receive the vehicle failure messages. The enabled infrastructure may be configured to check the failure vehicle's identification with lane information, provide updates of time and failure phase for traffic light operations, and for syncing with other operating infrastructure and traffic signals in the surrounding area to mitigate traffic congestion and enhance traffic flow. For example, if a traffic lane is configured with reversible indicators and signs (e.g., tunnel traffic), certain traffic lanes may be closed preventing vehicles from entering and causing less traffic backup if a vehicle failure occurs. The infrastructure signals can be operated to change configurable traffic lanes that can cause an impediment because of vehicle failure to traffic flow in the configurable traffic lane.

In various exemplary embodiments, the present disclosure describes methods, systems, and apparatuses to enable vehicles with V2X capabilities or are equipped with V2X enabled warning triangle reflectors and channels to receive multiple types of warning messages and messages of different warning levels in accordance with the speed and other characteristics of a vehicle deemed to be approaching or likely to approach a vehicle failure. For example, in response to the level of a warning message, a driver or operator of a vehicle or an autonomous vehicle may determine it is warranted based on the failure message to slow down or to change from an autonomous to manual operation.

FIG. 1 is a functional block diagram illustrating an autonomous or semi-autonomous vehicle having capabilities to receive failure messages from a V2X enabled safety warning triangle reflector that is wirelessly broadcasting in the surroundings or to distribute a vehicle failure message directly to the surrounding vehicles and infrastructure with V2X capabilities.

In an exemplary embodiment, the vehicle 100 is a model of autonomous vehicle such as the CRUISE® ORIGIN™ that is a six-passenger, autonomous, electric, SUV-sized that can be configured as a vehicle with V2X capabilities to receive broadcasted failure messages from a V2X enabled safety triangle reflector.

While it is contemplated that the disclosed subject matter is implemented in systems of an autonomous type of vehicle 100 other ways of deploying the disclosed subject are also feasible. For example, it is entirely possible for the subject matter to be deployed in or integrated into systems or equipment of other types of vehicles that may or may not be autonomous or remote devices such as drones.

With a reference to FIG. 1, the vehicle 100 having a network 105 (i.e., an all in-vehicle network) self-configuration processor system (inputs, ECU flags, vehicle states, ECUs, Sensors and sensor data, calibration data, etc. . . . ) 110 is shown in accordance with exemplary embodiments. Vehicle 100 includes a plurality of sensors 120, sensor ECUs 131, general ECUs 130, and a network self-configuration processor module 132 of a network configuration processor system 110. In an exemplary embodiment, the network configuration processor system The sensors sense observable conditions of the vehicle 100 and can include, but are not limited to, image, LIDAR, and radar sensors 120. Generally, each sensor of the plurality of sensors is specifically is coupled to the network self-configuration processor module (communication gateway controller) 132 of the vehicle 100 and configured to sense external surroundings of the vehicle 100. The network self-configuration processor module 132 receives sensor signals generated by the sensors 120 and provided by sensor ECUs 131, processes the sensor signals to obtain sensor data. Although the depicted embodiment realizes a platform as a vehicle 100, the concepts presented here can be deployed in other platforms, such as aircraft, spacecraft, watercraft, motorcycles, robots, robotic devices, and the like. Moreover, the concepts presented here may also be deployed in alternative mobile and non-mobile platform applications, if so desired.

As mentioned, the vehicle 100 generally includes a plurality of sensors 120, sensor ECUs 131, general ECU devices 130, and software, sufficient for ingesting digital information and/or sensing information, converting the sensed information into digital information, and providing the digital information to the network self-configuration processor system 110. Generally, each sensor of the plurality of sensors is configured to sense aspects of the surroundings of the vehicle 100.

Outside of the manufacturing context, the network self-configuration processor system 110 if configured, can allow data to be exfiltrated via 136 if in a designated region, and also incorporate additional consumer approval as an additional input to permit data collection. The transceiver 136 can be used to establish and maintain the communications links to onboard components and external communication sources to be used to provide additional data, such as connecting to the V2X enabled safety triangle reflector to receive and broadcast failure messages. The transceiver 136 can perform signal processing (e.g., digitizing, data encoding, modulation, etc.) as is known in the art and this instance for the temporal data received and sent.

With continued reference to FIG. 1, the components of the network self-configuration processor system 110 and their functions are described. In the depicted embodiment, the computer system of the network self-configuration processor system 110 includes networks 105, ECUs 130, an extra vehicle communication interface 146, and a communication gateway controller 132 with a block data processor 142 communicatively coupled to a memory 144, a storage device 148, an inter-processor bus 150, and an optional storage disk 158. In various embodiments, the network self-configuration processor system 110 performs actions and other functions described further below in connection with FIGS. 2-5. The block data processor 142 performs the computation and control functions attributed to the network self-configuration processor system 110 and may include any type of module or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the block data processor 142 loads and executes one or more programs, algorithms, and rules embodied as instructions and applications (i.e., the learning algorithm) 152 contained within the memory 144 and, as such, controls the general operation of the control system of the communication gateway controller 132. In executing the processes described herein, the block data processor 142 loads and executes at least a program 156.

A computer-readable storage medium, such as a memory 144, a storage device 148, or an optional storage disk 158 may be utilized as both storage and a scratchpad. The memory locations where data bits are maintained are physical locations that have particular electrical, magnetic, optical, or organic properties corresponding to the data bits. The memory 144 can be any type of suitable computer-readable storage medium. For example, memory 144 may include various types of dynamic random-access memory (DRAM) such as SDRAM, the various types of static RAM (SRAM), and the various types of non-volatile memory (PROM, EPROM, and flash). In certain examples, the memory 144 is located on and/or co-located on the same computer chip as the block data processor 142. In the depicted embodiment, the memory 144 stores the above-referenced instructions and applications 152 along with one or more configurable variables in stored values 154.

The storage device 148 is a computer-readable storage medium in the form of any suitable type of storage apparatus, including direct access storage devices such as hard disk drives, flash systems, floppy disk drives, and optical disk drives. In one exemplary embodiment, the storage device 148 includes a program product from which memory 144 can receive a program 156 that executes one or more embodiments of one or more processes of the present disclosure.

In another exemplary embodiment, the program product may be directly stored in and/or otherwise accessed by the memory 144 and/or a disk (e.g., optional storage disk 158), such as that referenced below.

The data records may be stored in the computer-readable storage medium, such as the memory 144, the storage device 148, or the optional storage disk 158. The internal buses 150 of 132 serve to transmit programs, data, status, and other information or signals between the various components of the computer system of the network self-configuration processor of system 110. The bus 150 can be any suitable physical or logical means of connecting computer systems and components. This includes, but is not limited to, direct hard-wired connections, fiber optics, infrared and wireless bus technologies. During operation, program 156, stored in memory 144, is loaded and executed by the block data processor 142.

The interface 146 may also include one or more network interfaces to allow 110 to communicate with external mobile devices, and/or manufacturing systems to permit communication with and potential storage of state information which ultimately can be placed into storage apparatuses, such as the storage device 148

In various embodiments, vehicle 100 is autonomous or semi-autonomous, and the control system of the communication gateway controller 132, and/or components thereof, are incorporated into the vehicle 100. The vehicle 100 is, for example, a vehicle that is automatically controlled to carry passengers from one location to another. The vehicle 100 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

Figure 2:
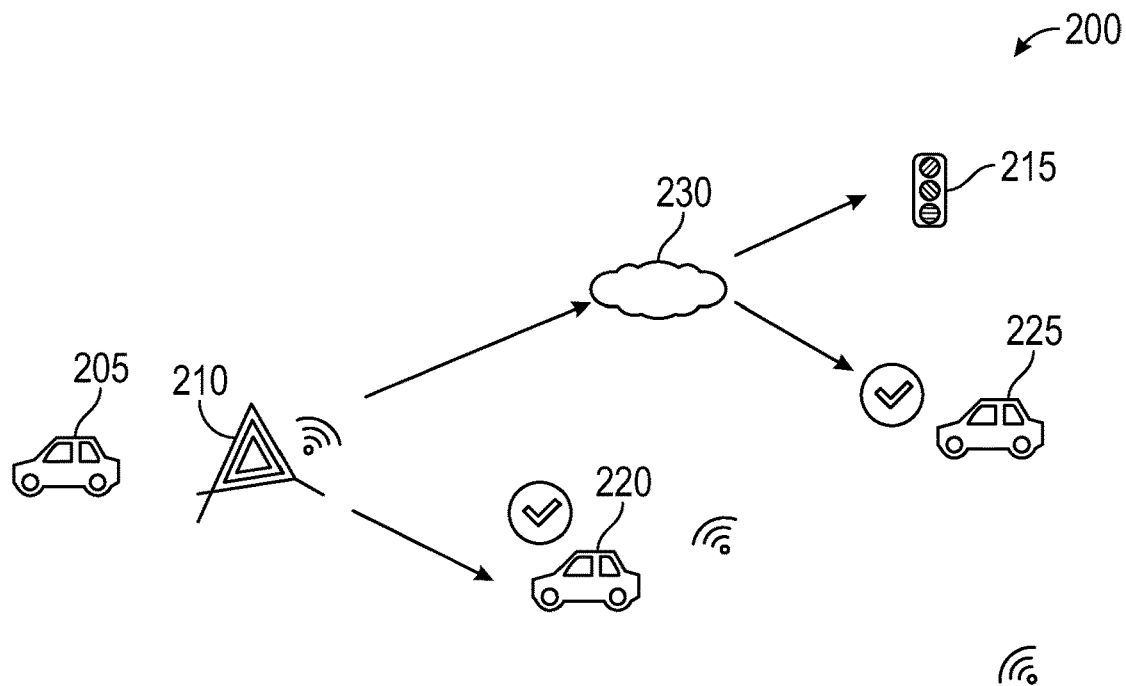
FIG. 2 illustrates an exemplary diagram of V2X enabled safety warning triangle ecosystem communicating wirelessly to multiple different entities of a V2X enabled safety warning triangle system in accordance with an exemplary embodiment.

FIG. 2 illustrates an exemplary diagram of V2X enabled safety warning triangle ecosystem communicating wirelessly to multiple different entities of a V2X enabled safety warning triangle system in accordance with an embodiment. In FIG. 2, there is shown an exemplary V2X ecosystem 200 that includes a failure vehicle 205 that is associated with a V2X enabled safety warning triangle 210 that can broadcast failure messages to cloud and edge connected devices via cloud 230 to receive the V2X failure messages for autonomous or semi-autonomous deployed vehicle navigation systems to receive updated traffic information and to optimize destination routes by executing detours and alternative routes based on the vehicle failure information. For example, to traffic lights, 215 (i.e., infrastructure) with direct V2X channel capability to receive the vehicle 205 failure messages broadcast by the V2X enabled safety triangle reflector 210.

Further, to enable navigations systems of cloud-connected vehicles 225 to receive the V2X failure messages for autonomous or semi-autonomous in-vehicle deployed vehicle navigation systems to receive updated traffic information and to optimize destination routes by executing detours and alternative routes based on the vehicle failure information. Also, to enable vehicles 220 with V2X capabilities or PCS communication systems to receive message warnings such as to receive multiple types of warning messages with different warning levels. In response to change the vehicle 220 operations in accordance with the speed and other characteristics of the vehicle when approaching or likely to approach a vehicle failure.

Figure 3:
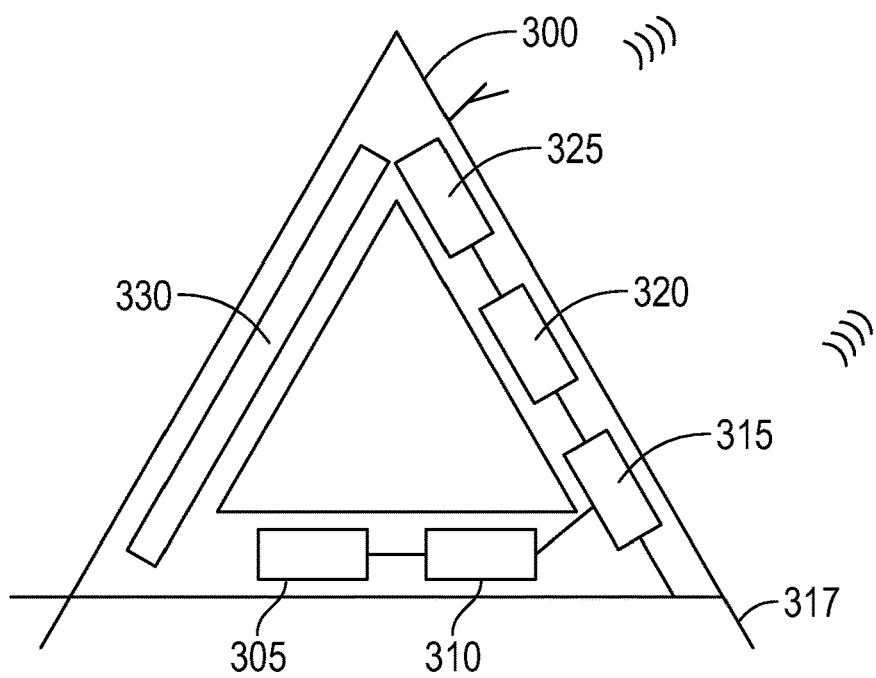
FIG. 3 illustrates an exemplary diagram of V2X enabled safety warning triangle configured with an antenna, V2X chip, battery charging system, and body of a V2X enabled safety warning triangle system in accordance with an exemplary embodiment.

FIG. 3 illustrates an exemplary diagram of V2X enabled safety warning triangle configured with an antenna 317, V2X chip (processor 325), battery charging system 310, and body 300 of a V2X enabled safety warning triangle system in accordance with an embodiment. In FIG. 3, the body 300 of the V2X enabled safety warning triangle includes a processor 325, a memory 320, a transceiver (i.e., transmitter and/or receiver) 315, rechargeable battery 310, interface 305, and lights 330. It is contemplated that there are a variety of ways to configure the elements that make up the body 300 of the V2X enabled safety warning triangle that may include additional or different elements and may be connected in many different ways to promote the functionalities of broadcasting failure messages on multiple channels to multiple types of entities.

In an exemplary embodiment, the processor 325 includes may include any type of module or multiple modules, single integrated circuits such as a micromodule working in cooperation with a V2X chip or the like to carry out the described operations, tasks, and functions by manipulating electrical signals representing data bits at memory locations of the memory 320, as well as other processing of signals to generate multiple types of failure messages; and to process vehicle information and to store the vehicle information in the memory 320.

In an exemplary embodiment, the processor 325 and memory 320 are configured to operate independently of a failure vehicle, at a distance that prevents continuous or even intermittent wireless connectivity, and to broadcast independently failure messages on multiple different channels to multiple different entities.

The transceiver 315 can be configured as a transmitter to broadcast the failure messages, and a receiver to connect wirelessly with the associated failure vehicle to receive failure message information.

The body 300 also includes an integrated antenna 317 to enable the broadcasting in the surrounding area the failure messages, lights 330 providing visual alerts of the safety reflector triangle, and a battery chargeable system 310 that is connectable to the vehicle for charging. The charging of the battery chargeable system 310 is performed either wirelessly or by a cable connectable to the V2X enabled safety warning triangle's body 300 while the body 300 is placed in the vehicle trunk or other compartment of the vehicle, or it can be charged outside the vehicle by a connectable cable to power or USB outlet. In an exemplary embodiment, the V2X enabled safety warning triangle may be configured with a replaceable or swappable battery pack instead of the battery chargeable system 310.

Figure 4:
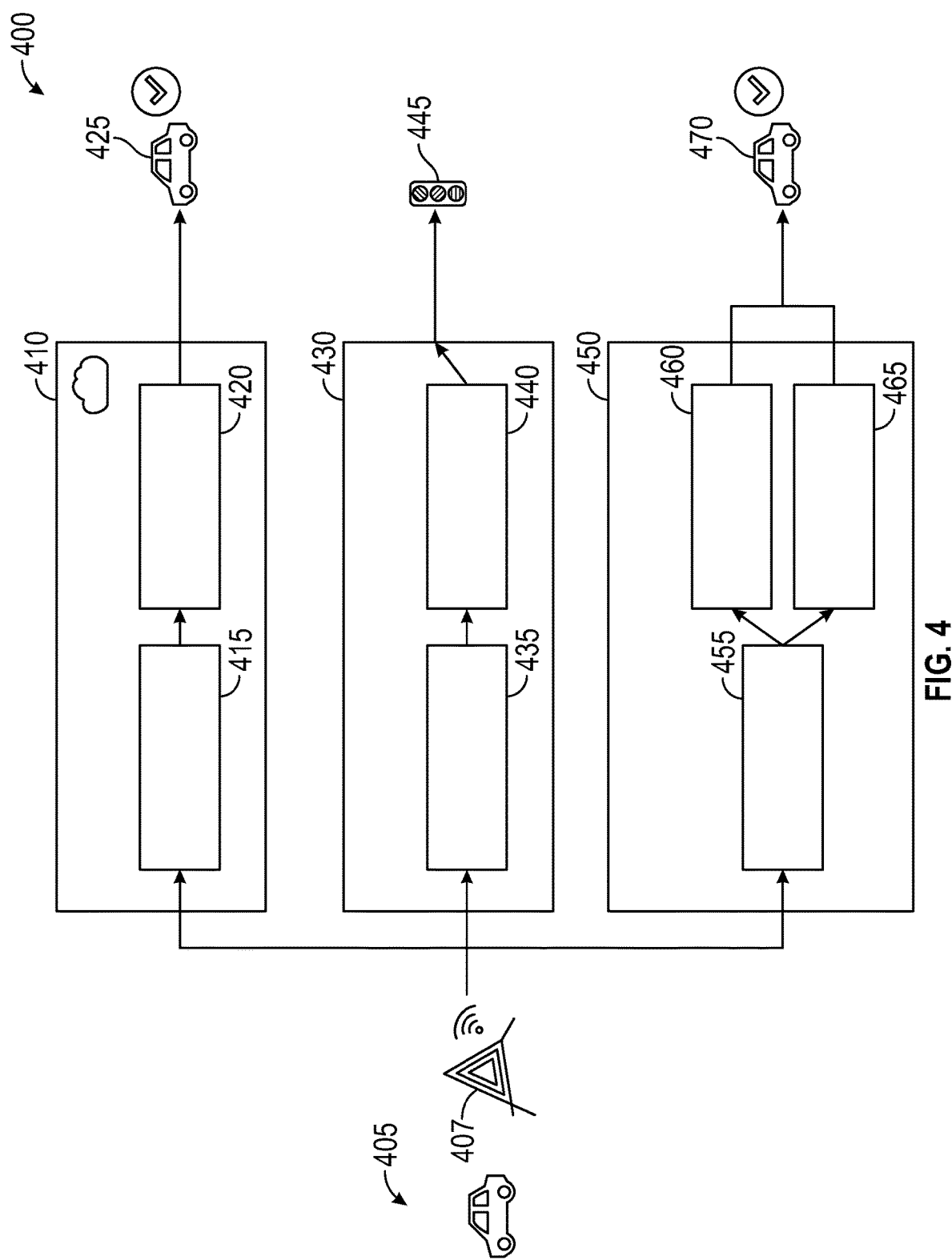
FIG. 4 illustrates an exemplary diagram of multiple different architectures of a cloud/edge channel, direct channel coupled to roadside infrastructure, and a direct channel configured with Personal Communication Service (PCS) broadcast warnings of the V2X enabled safety warning triangle system in accordance with an exemplary embodiment.

FIG. 4 illustrates an exemplary diagram of multiple different architectures of a cloud/edge channel, direct channel coupled to roadside infrastructure, and a direct channel configured with PCS broadcast warnings of the V2X enabled safety warning triangle system in accordance with an embodiment. In FIG. 4, the multiple different channel diagrams 400 includes a failure vehicle 405 that is associated (i.e., wireless connected or prior provisioned with vehicle information) with a V2X enabled safety warning triangle 407 that is connectable wireless via a V2X network consisting of multiple channels. A first channel consisting of a cloud and end channel 410 to receive the V2X failure messages 415 for maneuver optimization 420 for navigation systems 425 deployed in a set of autonomous or semi-autonomous in the surrounding area that is capable of receiving updated traffic information and can optimize destination routes by executing detours and alternative routes based on the vehicle failure information that is sent from the V2X enabled safety warning triangle 407. Also, the various navigation systems 425 distribute optimized route information based on the vehicle failure data to other vehicle's navigation systems 425 that in the connected ecosystem (i.e., the cloud and edge channel 410 network).

A second channel consisting of a direct channel to infrastructure 430 entities like traffic signals 445 that based on a failure message 435 received can be operationally configured for various phases and timings in switching operations to control traffic flow. For example, traffic light operations and for syncing with other operating infrastructure and traffic signals in the surrounding area to mitigate traffic congestion and enhance traffic flow. If a traffic lane is configured with reversible indicators and signs (e.g., tunnel traffic), certain traffic lanes, the traffic signal 440 may enable lane closures to control vehicles entering and leaving to prevent a traffic jam.

A third channel is also configured to receive failure messages 455 that is a personal communication service (PCS) channel 450 connect to the V2X enabled safety warning triangle 407. The failure messages 455 can be prioritized into different levels 460 and also can include speed advisories 465 for approaching vehicles in the surroundings of the failure vehicle 405. In an embodiment, driver and driver-based decision systems configured in autonomous vehicles 470 can receive the speed advisories and different levels of warning messages to change vehicle operations to respond to a level of a warning message and reduce speed because of the speed advisory 465.

Figure 5:
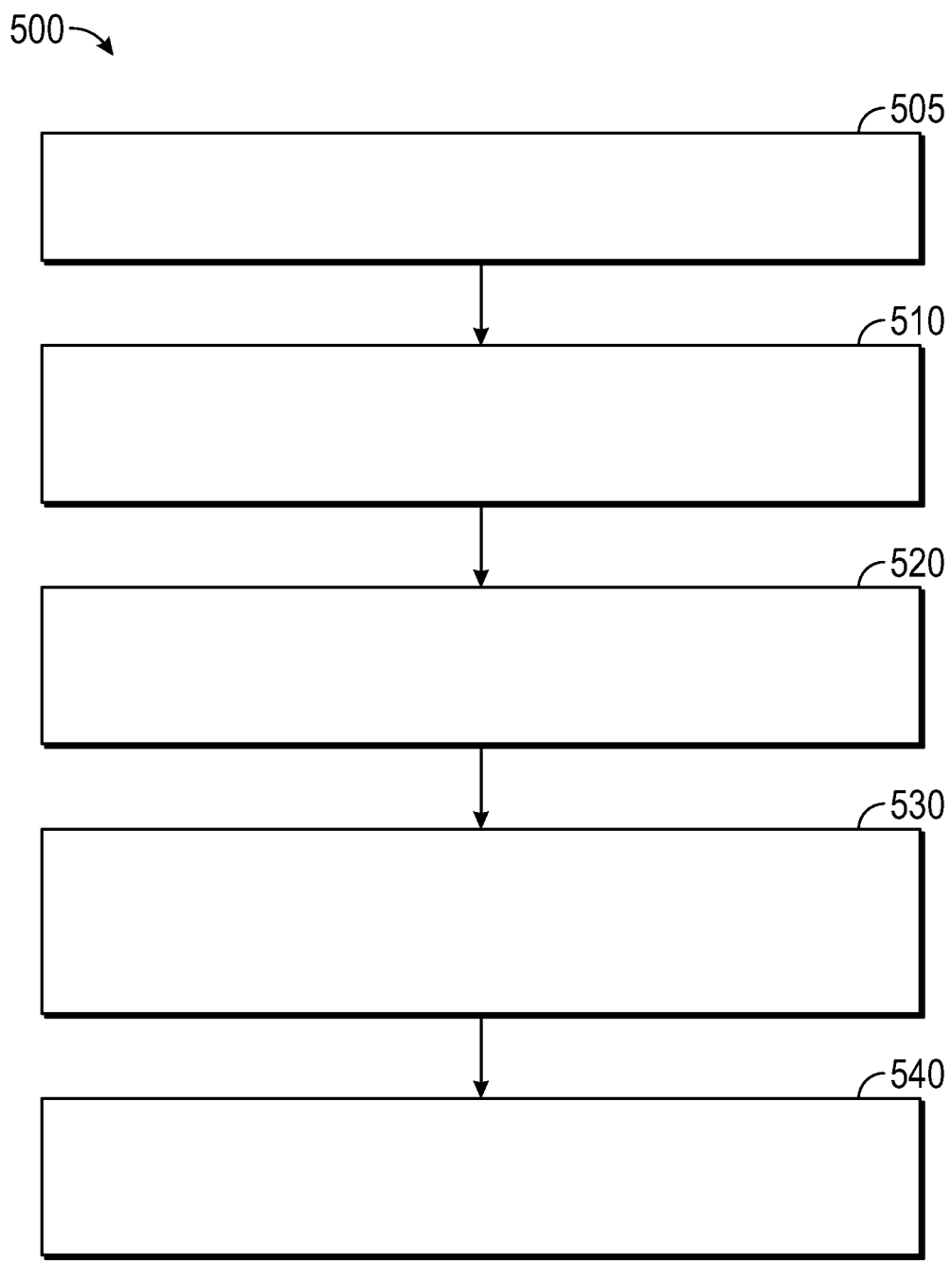
FIG. 5 illustrates an exemplary flowchart of multiple different architectures of a cloud/edge channel, direct channel coupled to roadside infrastructure, and a direct channel configured with PCS broadcast warnings of the V2X enabled safety warning triangle system in accordance with an exemplary embodiment.

FIG. 5 illustrates an exemplary flowchart of multiple different architectures of a cloud/edge channel, direct channel coupled to roadside infrastructure, and a direct channel configured with PCS broadcast warnings of the V2X enabled safety warning triangle system in accordance with an embodiment.

The method 500 of FIG. 5 includes task 505 of initially provisioning or completing an initial set-up of the V2X enabled safety warning triangle system that can include locally storing vehicle identification and related characteristics in memory contained in the body of the V2X enabled safety warning triangle to enable the independent generation of warning messages if wireless connectivity with failure vehicle is not present or achievable.

For example, a V2X enabled safety warning triangle may be deployed at a roadside location that cannot receive wireless communications from the failure vehicle. In this case, because of prior provisioned information about the vehicle, the V2X enabled safety warning triangle can broadcast messages. Additionally, before or prior to deployment, updated information such as GPS information of the failure vehicle, time information, and a phase or kind of vehicle failure may also be transferred to the memory of the deployed V2X enabled safety warning triangle. Next at task 510, at a scene of vehicle failure, a driver or other person deploys the V2X enabled safety warning triangle that initiates broadcasting of failure messages that include V2X Failure service identification (ID), vehicle or the V2X safety warning triangle location, lane information, timestamp, and vehicle ID (if applicable).

At task 520, the Cloud or Edge devices received the V2X failure message. In response, the vehicle, cloud server, and edge device navigation systems execute traffic updates that include updated traffic information, new route selections, detours, or alternative route suggestions to navigation systems of the various devices and vehicles and distribute alerts and updates to devices and vehicles in the surrounding area that are networked or able to access and receive updates and alerts.

At task 530, the transmitter broadcasts failure messages to infrastructure entities that communicate on a direct V2X channel and are capable of receiving a vehicle failure message. In an exemplary embodiment, upon receipt of a failure message, an infrastructure entity can be configured to check the failure vehicle identification and corresponding traffic lane information. The infrastructure entity can proceed to update a phase and time-related information of traffic lights in the surrounding area to sync operation with the failure vehicle event to manage traffic flow by syncing traffic light operations thereby preventing traffic congestion. In another exemplary embodiment, if a traffic lane in the surroundings is equipped with reversible indicators and signs, various lane closures can be performed to prevent vehicles from entering lanes with a vehicle failure and causing further traffic congestion and/or traffic jams in the surrounding area.

At task 540, the vehicles with V2X capabilities or equipped with V2X enabled warning triangle reflectors can receive the warning message with different warning level as the vehicles approach the failure vehicle to change vehicular operation such as reducing speed in view of the failure vehicle and likely traffic congestion in the surrounding area.

It should be appreciated that process of FIGS. 1-5 may include any number of additional or alternative tasks, the tasks shown in FIGS. 1-5 need not be performed in the illustrated order and process of the FIGS. 1-5 may be incorporated into a more comprehensive procedure or process having additional functionality not described in detail herein. Moreover, one or more of the tasks shown in FIGS. 1-5 could be omitted from an embodiment of the process shown in FIGS. 1-5 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof

What is claimed is:

1. A method to deploy a vehicle-to-everything (V2X) enabled safety triangle warning reflector, comprising:
   receiving, via an interface of the V2X enabled safety triangle warning reflector, vehicle information before deployment of the V2X enabled safety triangle warning reflector, for storing the vehicle information in a memory disposed locally at the V2X enabled safety triangle warning reflector for subsequent use at the deployment;
   generating, by a processor chip configured in the V2X enabled safety triangle warning reflector in communication with the memory, a failure message associated with a vehicle failure based at least on the vehicle information contained locally in memory wherein the vehicle information is independently generated without requiring a wireless connection with a failure vehicle; and
   broadcasting, the failure message generated by the processor chip via a transmitter disposed of in the V2X enable safety triangle warning reflector during a vehicle failure, wherein the failure message is broadcasted in a surrounding area of the failure vehicle on a set of multiple different channels comprising cloud, infrastructure, and personal communication service (PCS) channels to entities that provide traffic and vehicle control.

2. The method of claim 1, further comprising:
   enabling broadcast of the failure message, by the V2X enabled safety triangle warning reflector, at a location that is at a distance that exceeds an operating field of the wireless connection to the failure vehicle.

3. The method of claim 2, further comprising:
   broadcasting, via the transmitter, the failure message by the V2X enabled safety triangle warning reflector for receipt by cloud channels coupled to connected navigation systems of operating vehicles in the surrounding area to enable navigation alerts and route changes by the connected navigation systems.

4. The method of claim 3, further comprising:
   broadcasting, via the transmitter, the failure message by the V2X enabled safety triangle warning reflector for receipt by infrastructure channels to traffic systems comprising at least traffic signals that sync signal operations to prevent traffic congestion caused by the failure vehicle in vehicle lanes in the surrounding area.

5. The method of claim 4, further comprising:
   broadcasting, via the transmitter, the failure message by the V2X enabled safety triangle warning reflector on PCS channels within the distance of the failure vehicle for manual driver alerts of vehicles in the surrounding area.

6. The method of claim 5, further comprising:
   broadcasting, via the transmitter, the failure message by the V2X enabled safety triangle warning reflector on PCS channels at multiple warning levels to enable measured autonomous vehicles and manual driver operational responses based on a warning level received.

7. The method of claim 6, wherein the failure message comprises a set of failure messages that at least comprises time information, vehicle identification, and location information, and V2X safety triangle warning reflector location information.

8. A system comprising:
   a processor chip configured with a set of instructions to enable a Vehicle-To-Everything (V2X) safety triangle warning device to:
   receive via a wireless interface from a failure vehicle, vehicle identification information to store in memory locally at the V2X enabled safety triangle warning reflector device;
   generate a failure message associated with the vehicle failure from at least the vehicle identification information stored locally in memory without a wireless connection with the failure vehicle; and
   broadcast the failure message by a transmitter disposed of in the V2X enabled safety triangle warning reflector device during a vehicle failure in a surrounding area of the failure vehicle on a set of multiple different channels comprising cloud, infrastructure, and personal communication service (PCS) channels for receipt by a set of entities comprising vehicle navigation systems, traffic signals, and driver decision systems.

9. The system of claim 8, further comprising:
   enable the broadcast of the failure message, by the V2X enabled safety triangle warning reflector, at a location that is at a distance that exceeds an operating field of the wireless connection to the failure vehicle.

10. The system of claim 9, further comprising:
    broadcast, via the transmitter, the failure message by the V2X enabled safety triangle warning reflector for receipt by cloud channels coupled to connected navigation systems of operating vehicles in the surrounding area to enable navigation alerts and route changes by the connected navigation systems.

11. The system of claim 10, further comprising:
    broadcast, via the transmitter, the failure message by the V2X enabled safety triangle warning reflector for receipt by infrastructure channels to traffic systems comprising at least traffic signals that sync signal operations to prevent traffic congestion caused by the failure vehicle in vehicle lanes in the surrounding area.

12. The system of claim 11, further comprising:
    broadcast, via the transmitter, the failure message by the V2X enabled safety triangle warning reflector on PCS channels at multiple warning levels to enable measured autonomous vehicles and manual driver operational responses based on a warning level received.

13. The system of claim 12, wherein the failure message comprises a set of failure messages that at least comprise time information, vehicle identification and location information, and V2X safety triangle warning reflector location information.

14. A Vehicle-to-Everything (V2X) safety triangle warning reflector apparatus comprising:
    a V2X safety triangle warning reflector controller comprising a processor chip wherein the processor chip is instructed to:
    receive via a wireless interface from a failure vehicle, vehicle identification information to store in memory locally at the V2X enabled safety triangle warning reflector device;
    generate a failure message associated with the vehicle failure from at least the vehicle identification information stored locally in memory without a wireless connection with the failure vehicle; and
    broadcast the failure message by a transmitter disposed of in the V2X enable safety triangle warning reflector device during a vehicle failure in a surrounding area of the failure vehicle on a set of multiple different channels comprising cloud, infrastructure, and personal communication service (PCS) channels for receipt by a set of entities comprising vehicle navigation systems, traffic signals, and driver decision systems.

15. The V2X safety triangle warning reflector apparatus of claim 14, further comprising:
    the processor chip configured to:
    enable the broadcast of the failure message, at a location that is at a distance that exceeds an operating field of the wireless connection to the failure vehicle.

16. The V2X safety triangle warning reflector apparatus of claim 15, further comprising:
    the processor chip configured to:
    broadcast, via the transmitter, the failure message for receipt by infrastructure channels to traffic systems comprising at least traffic signals that sync signal operations to prevent traffic congestion caused by the failure vehicle in vehicle lanes in the surrounding area.

17. The V2X safety triangle warning reflector apparatus of claim 16, further comprising:
    the processor chip configured to:
    broadcast, via the transmitter, the failure message for receipt by cloud channels coupled to connected navigation systems of operating vehicles in the surrounding area to enable navigation alerts and route changes by the connected navigation systems.

18. The V2X safety triangle warning reflector apparatus of claim 17, further comprising:
    the processor chip configured to:
    broadcast, via the transmitter, the failure message by the V2X enabled safety triangle warning reflector for receipt by infrastructure channels to traffic systems comprising at least traffic signals that sync signal operations to prevent traffic congestion caused by the failure vehicle in vehicle lanes in the surrounding area.

19. The V2X safety triangle warning reflector apparatus of claim 18, further comprising:
    the processor chip configured to:
    broadcast, via the transmitter, the failure message on PCS channels at multiple warning levels to enable measured autonomous vehicles and manual driver operational responses based on a warning level received.

20. The V2X safety triangle warning reflector apparatus of claim 19, wherein the failure message comprises a set of failure messages that at least comprise time information, vehicle identification, and location information, and V2X safety triangle warning reflector location information.

* * * * *